Nov. 26, 1968 R. K. BARNHART 3,412,419
MOP DELINTER CART
Filed Nov. 7, 1966
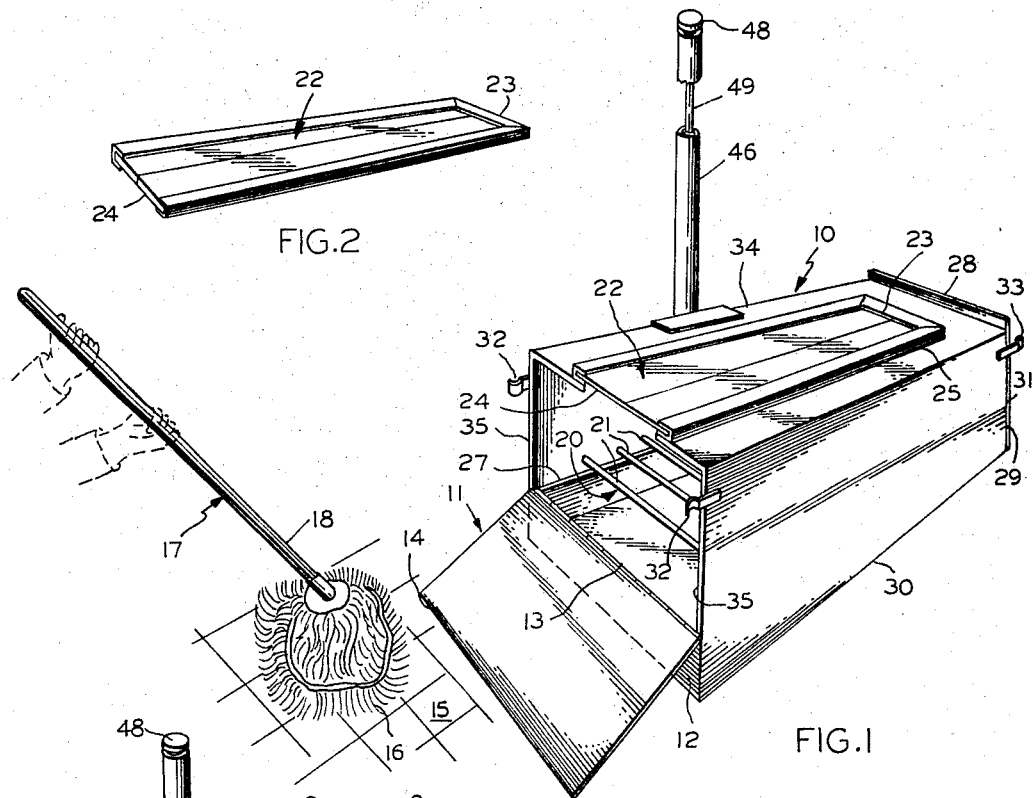
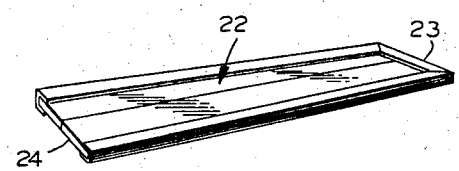
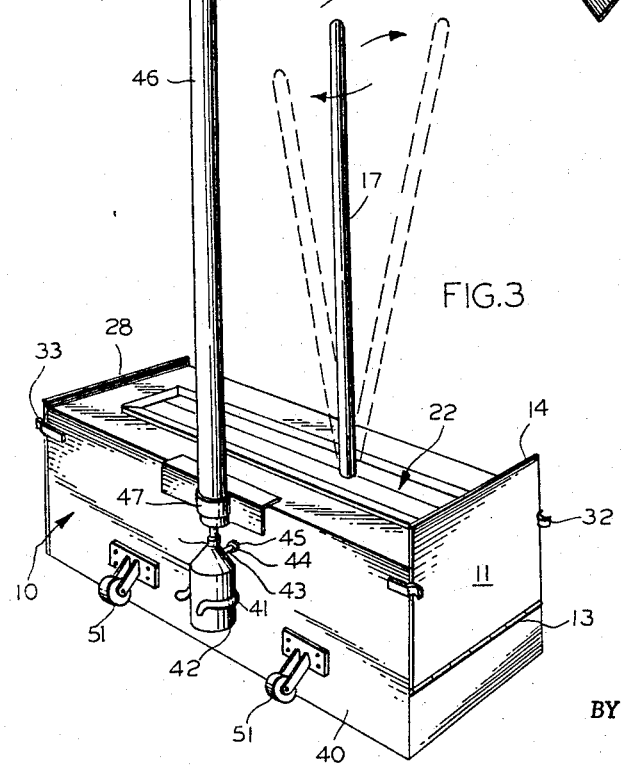
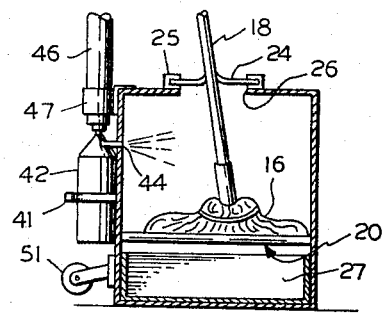
INVENTOR
RUTH K. BARNHART
BY Cohn and Powell
ATTORNEYS

United States Patent Office 3,412,419
Patented Nov. 26, 1968

3,412,419
MOP DELINTER CART
Ruth K. Barnhart, 918 S. 2nd St.,
Festus, Mo. 63028
Filed Nov. 7, 1966, Ser. No. 592,533
8 Claims. (Cl. 15—257.1)

ABSTRACT OF THE DISCLOSURE

The dust-sealable container includes a ramp providing a dust-sealing closure for the container aperture. A delinting grill is disposed within the container at the head of the ramp to facilitate transference of the cleaning head from the ramp to the grill. A self-sealing slot communicates with the container aperture to receive the handle of a cleaning utensil and thereby permit the utensil to be disposed on the support means in the proximity of an orifice through which dust-settling disinfectant fluid is supplied to the container.

---

This invention relates generally to improvements in floor cleaning, and more particularly to the disposal of dirt and dust from mops, brushes and the like, as the cleaning process progresses.

In apartment buildings, where the occupant of an individual apartment dwelling may be some distance from a convenient dust disposal and brush cleaning area, efficient and hygienic floor cleaning is a problem. The problem is present also in hotels and even in the home. In simple domestic cleaning, the housewife is constantly presented with the inconvenience of having to go out of doors to shake her cleaning utensils free of dust. Even though a container may be readily available, the difficulty of transferring foreign matter into the container without stirring up dust, remains. This problem is, of course, particularly acute in hospitals where it is essential to keep the air free from germ-laden particles and to maintain the cleaning utensils in a hygienic condition. It is the principal object of the present invention to provide a convenient and sanitary method of dust disposal and utensil cleaning.

It is a most important object to provide a sealable, box-like container having an attachable ramp at one end so that foreign matter may be transferred directly into the container without the necessity of lifting the cleaning utensil from a contacting surface, thereby avoiding a cloud of dust and the dropping of foreign matter from the cleaning utensil. This procedure conforms to the strict sanitation regulations of hospitals and nursing homes. The ramp acts as an extension of the floor surface.

An important object is the provision of a container closure door hingedly rotatable about its lower margin to form a ramp.

Another important object is the provision of a grill within the container at substantially the same elevation as the head of the ramp, against which the cleaning head may be placed and shaken free from dust after the container has been sealed.

It is a further important object to provide means injecting a liquid spray into the sealed container to serve as a dust settler.

Another important object is the injection into the container of a sanitizing agent for the purpose of disinfecting both the dust within the container and the cleaning head.

Yet another important object is the provision in the container of a self-sealing slot communicating with the container entrance aperture at the head of the ramp and allowing the handle of the cleaning utensil to be freely moved, thereby to agitate the utensil and shake the head free of foreign matter.

Another important object is realized by providing a removable dust tray under the grill on which the cleaning head is shaken, the tray receiving foreign matter as it falls.

It is an important object to provide an access aperture door hingedly attached at its lower margin to the bottom of the container, to facilitate removal of the dust tray.

An important object is the provision of wheels and a handle so that the container is thereby rendered mobile, the wheels being located on the side of the container so that the bottom of the container is flat on the floor surface in its main operational position.

Still another important object is the provision of a mobile container which may be utilized to store and transport cleaning utensils.

It is an important object to provide a device that is simple and durable in construction, economical to manufacture and easy to use.

The foregoing and numerous other objects and advantages of the invention will more clearly appear from the following detailed description of a preferred embodiment, particularly when considered in connection with the accompanying drawing, in which:

FIG. 1 is a perspective view of the cleaning unit in its operating position;

FIG. 2 illustrates the removable framed seal;

FIG. 3 is a perspective view of the rear of the unit illustrating the spray injection device; and FIG. 4 is a partial sectional view through the container showing the cleaning utensil in its delinting and desanitizing position.

Referring now by characters of reference to the drawings and first to FIG. 1, it will be understood that the cleaning unit includes a box-like container 10 having access apertures at each end. At one end, the access aperture 19 is closed and sealed by a ramp-closure door 11, the ramp-closure door 11 having one margin hingedly attached along the upper edge of a horizontal stub and plate 12 along a substantial horizontal axis below the container aperture 19. A gasket 35 around the rim of the access aperture 19 ensures that the ramp-closure door 11 seals the end of the container 10 when the door 11 is in its closed position.

In its open operational position, the ramp-closure door 11 constitutes a ramp means, the ramp-closure door 11 having its upper margin 14 in contact with the floor 15. Dirt may be transferred into container 10 by sweeping the dirt up the ramp-closure door 11, the dirt being propelled up the slope of the ramp-closure door 11 by means of the mop cleaning head 16. After reaching the head of the ramp-closure door 11, the mop cleaning head 16 is placed on the support means or grill 20 formed by dowels 21, the ramp-closure door 11 being closed behind the mop 17, as is clearly shown in FIG. 3.

The mop handle 18 protrudes from the container 10 through the slit between the two portions of the elongate framed seal 22. The seal 22 includes frame 23 of U-shaped configuration and an inverted channel section, containing a divided seal 24 of foam rubber or other such pliable material. The framed seal 22 may be removed for replacement in case of wear by withdrawal from the framed seal guides 25 disposed around the margins of the elongate self-sealing slot 26 that communicates with the container aperture 19.

Within the container 10 and resting beneath the grill 20 is a removable dirt tray 27 for collecting the foreign matter which falls from the head 16 of the mop 17 as the latter is agitated in order to remove foreign matter from the head 16. Oppositely placed from the ramp-closure door 11 at the other end of container 10 is a tray-removal door 28. The tray-removal door 28 is hingedly attached at its lower margin to the bottom panel 30 of container 10. The door 28 may be hingedly opened to a location parallel to and in contact with the floor 15, thus allowing the unobstructed withdrawal of the dirt tray 27. A gasket 31 around the edge of the tray-removal door aperture acts to dust-seal the door 28 in its closed position.

Both the ramp-closure door 11 and the tray-removal door 28 are held in a closed position by means of spring clips 32 and 33 respectively or similar means, and both doors 11 and 28 in the closed position have portions projecting above the top panel 34 of the container 10 to facilitate opening of the doors 11 and 28.

Removably attached to the rear panel 40 of container 10 by means of a spring clamp 41 projecting from the rear panel 40, is an aerosol spray can 42 containing a supply of dust-settling fluid having disinfectant property. The nozzle 43 of can 42 is in communication with the inside of container 10 through the orifice 44, constituting an orifice access means. The orifice 44 has a seal 45 with the nozzle 43.

A hollow handle 46 is rigidly attached to the rear panel 40 of container 10 by means of U-shaped clamp 47. At the upper end of the handle 46 is a spring-loaded push-button 48. The button 48 is connected to an actuating rod 49 which is in pressure contact at its lower end with the actuating push-button 50 provided on the aerosol can 42.

Caster units 51 rigidly attached to the rear panel 40 provide the cleaning unit with mobility.

It is thought that the functional advantages of this cleaning unit have become fully apparent from the foregoing description of parts, but for completeness of disclosure, the installation and usage of the cleaning unit will be briefly described.

FIG. 1 shows the initial working position of the cleaning unit. Dirt is swept from the floor 15 up the sloping face formed by the ramp-closure door 11. When the mop cleaning head 16 arrives at the head of the ramp-closure door 11, the ramp-closure door 11 is swung upwardly about the axis of the hinge 13 to close as the mop cleaning head 16 is transferred to the grill 20, the grill 20 being in line with the head of the ramp-closure door 11. The handle 18 of mop 17 is pushed in between the split portions of the elongate seal 24 and is moved into a position within the interior of the container 10. Spring clips 32 act to hold the ramp-closure door 11 securely in closed position against gaskets 35 around the edges of the container aperture 19. The container 10 now being dust sealed, the mop handle 18 may be agitated so that foreign matter is shaken free from the mop head 16 to fall through the grill 20 and into the dirt tray 27.

The mop head 16 may now be moved into proximity with, yet below, the orifice 44 located toward the center of the container 10. Depression of the spring-loaded push-button 48, acting in conjunction with the actuating rod 49, actuates the push-button 50 of the aerosol can 42, causing the injection of a disinfectant spray into the interior of the container 10 which settles and disinfects the dust caused by the agitation of the mop 17. The disinfectant also disinfects the cleaning head 16.

By opening the ramp-closure door 11 and placing its upper margin 14 in contact with the floor surface 15 to form a ramp and by withdrawing the now sanitized and delinted mop, the floor sweeping may be resumed.

It will be observed that an operator standing at the rear of the cleaning unit may, by grasping handle 46 and rotating the container 10 about its lower rear edge, cause the caster wheels 51 to come into operable contact with the floor 15. In this way the cleaning unit is made mobile. It will be clear that several cleaning utensils may be hygienically transported within the cleaning unit. In such a situation it is recommended that the handles of the utensils be lashed or otherwise attached to handle 46.

The cleaning unit may be discharged of foreign matter by removing it to a convenient disposal area. The opening of the tray-removal door 28 by swinging the door 28 about the axis of hinge 29 allows the dirt tray 27 to be removed and the contents thereof discharged.

Although the invention has been described by making detailed reference to a single preferred embodiment, such detail is to be understood in an instructive rather than in any restrictive sense, many variations being possible within the scope of the claims hereunto appended:

I claim as my invention:

1. A cleaning unit for delinting cleaning heads of mops, brushes and the like comprising:
   (a) a dust-sealable dirt container including an aperture allowing the entry of a surface contact cleaning head into the container,
   (b) ramp means connected to the container and elevating foreign matter propelled by the cleaning head to a point of transference into the container, and
   (c) support means within the container supporting the cleaning head, the support means including a delinting grill disposed at substantially the elevation achieved by the head of the ramp means, the grill effecting smooth transference of the cleaning head into the container wherein foreign matter may be shaken free from the cleaning head, the ramp means selectively constituting a dust-sealing closure for the container aperture after said transference.

2. A cleaning and sanitizing unit for delinting cleaning heads of mops, brushes and the like, comprising:
   (a) a dust-sealable dirt container including an aperture allowing the entry of a surface cleaning head into the container,
   (b) a supply of dust-settling fluid,
   (c) orifice access means into the container,
   (d) actuating means injecting the fluid through the orifice access means to settle the dust in the interior of the container, and
   (e) support means within the container supporting the cleaning head and including a delinting grill disposed within the container in the proximity of and below the orifice means.

3. A cleaning and sanitizing unit for mops, brushes and the like which include handles attached to the cleaning heads, comprising:
   (a) a dust-sealable dirt container including an aperture allowing the entry of a surface contact cleaning head into the container,
   (b) a supply of dust-settling fluid,
   (c) orifice access means into the container, and
   (d) actuating means injecting the fluid through the orifice access means to settle the dust in the interior of the container,
   (e) the container including a self-sealing slot communicating with the container aperture to receive the handle and locate the cleaning head in the proximity of the orifice access means.

4. A cleaning and sanitizing unit as defined in claim 3, in which:
   (f) means within the container supports the cleaning head in the proximity of and below the orifice access means to disinfect the cleaning head effectively.

5. A cleaning and sanitizing unit for delinting the heads of mops, brushes and the like, comprising:
   (a) a dust-sealable dirt container including an aperture allowing the entry of a surface contact cleaning head into the container,
   (b) a supply of dust-settling fluid,
   (c) orifice access means into the container, of the container, and
   (d) actuating means injecting the fluid through the orifice access means to settle the dust in the interior of the container,
   (e) ramp means connected to the container and leading to container aperture, the ramp means elevating foreign matter propelled by the cleaning head to a point of transference into the container wherein foreign matter may be shaken free from the cleaning head after the container has been dust-sealed.

6. A cleaning and sanitizing unit as defined in claim 5, in which:
(f) the ramp means is a door mounted to the container selectively closing and sealing the container aperture.

7. A cleaning and sanitizing unit as defined in claim 5 for mops, brushes and the like which include handles attached to the cleaning head, in which:
(g) the ramp means is hingedly mounted to the container on a substantially horizontal axis below the container aperture, the ramp means selectively constituting a closure for the container aperture to seal the container after the cleaning head has moved up the ramp means and into the container through the container aperture,
(h) support means is within the container at substantially the elevation at the head of the ramp means, and below the orifice access means, the support means effecting a smooth transference of the cleaning head into the container and cooperating with relative movement of and engagement by the cleaning head to shake free foreign matter from the cleaning head, and
(i) the container includes a self-sealing slot communicating with the container aperture to receive the handle incident to placement of the cleaning head into the container and on the support means in proximity to the orifice access means.

8. A cleaning and sanitizing unit as defined in claim 7, in which:
(j) the actuating means includes a handle extending upwardly from the container, and a rod carried by the container handle and operatively connected to the supply of disinfectant fluid, the rod being operable from the upper end of the container handle to inject the fluid from the supply into the container.

References Cited

UNITED STATES PATENTS

| | | | |
|---|---|---|---|
| 1,498,341 | 6/1924 | Binder | 15—257.6 |
| 1,572,102 | 2/1926 | Braunsdorf | 15—142 |
| 1,817,536 | 8/1931 | Spanel | 15—257.1 X |
| 1,892,494 | 12/1932 | Reynolds | 15—142 |
| 3,017,652 | 1/1962 | Morabito | 15—257.5 |

EDWARD L. ROBERTS, *Primary Examiner.*